3,491,006
PROCESS FOR PREPARING CYCLOBUTANE-1,2-
DINITRILE FROM ACRYLONITRILE
Jurgen Runge, Leipzig, and Reinhard Kache, Schkopau,
Germany, assignors to VEB Chemische Werke Buna,
Schkopau, Germany
No Drawing. Continuation-in-part of application Ser. No. 547,417, May 4, 1966. This application May 1, 1967, Ser. No. 634,916
Int. Cl. B01j *1/10*
U.S. Cl. 204—158                    13 Claims

ABSTRACT OF THE DISCLOSURE

The present invention relates to a process for preparing cyclobutane-1,2-dinitrile from acrylonitrile by irradiation of acrylonitrile with rays of the wave length ranging from 800 to 160 m$\mu$, preferably in the presence of a polymerization inhibitor.

The present invention is a continuation-in-part of our copending application Ser. No. 547,417, filed May 4, 1966, now abandoned.

The cyclobutane-1,2-dinitrile is a very useful compound as an intermediate in the preparation of polyamides.

It is known that acrylonitrile can be dimerized under pressure at elevated temperatures into cyclobutane-1,2-dinitrile, (so-called thermal dimerization) the conversion being about 5%. Proposals were already made for improving the yields by carrying out the dimerization in the presence of catalysts, or of water and acid.

While it was possible to achieve an increase in the yields in the manner mentioned, the methods have the shortcoming that together with the desired dimerization product, varying amounts of undesirable byproducts and resins will be obtained. Furthermore, there is the danger, due to the high temperatures involved, ranging from 190 to 300° C., that spontaneous polymerization and resin formation of the acrylonitrile with its accompanying harmful effects cannot be excluded with certainty.

It is the object of this invention to provide a process which permits to overcome the drawbacks inherent in the current methods for making cyclobutane-1,2-dinitrile from acrylonitrile.

It is a further object to provide a process which will make it possible to avoid the use of high temperatures.

It is yet another object of the invention to provide a process for the preparation of cyclobutane-1,2-dinitrile which uses as source of energy one that will exclude the formation of resins and other undesirable by-products.

Other objects and advantages of the invention will become apparent from the following detailed description.

It has been found that the above objects can be accomplished in accordance with the invention by subjecting acrylonitrile to irradiation, more particularly to u.v. radiation. If this is done, acrylonitrile will be converted into cyclobutane-1,2-dinitrile without supply of heat, the product being a mixture of cis- and trans cyclobutane-1,2-dinitrile which is to be isolated by distillation. Thus, acrylonitrile is irradiated either alone or with addition of one or more polymerization inhibitors and/or one or more photo-sensitizing agents, if desired. In some cases, the irradiation will be carried out in a solvent or a mixture of solvents.

For the irradiation, the acrylonitrile is placed into a vessel which is permeable to light and u.v. rays. The irradiation may be either effected from a source of light emitting visible and/or u.v. rays which is arranged outside the vessel, or, according to another embodiment, placed inside the vessel by immersion. Cooling, stirring, and rinsing with an inert gas are optional measures.

The range of wave length for the irradiation of the acrylonitrile is between 800 and 160 m$\mu$.

It has been found that the photo-dimerization of acrylonitrile may be carried out with complete exclusion of polymerization if, before starting the irradiation, acrylonitrile is mixed with one or several polymerization inhibitors. These inhibitors are compounds which are usually added for stabilization of acrylonitrile, e.g. polyvalent phenols, particularly hydroquinone, resourcinol, quinones, inorganic and organic salts of monovalent or divalent copper, ammonia and amines of different kinds, especially $\beta$-amino-propionitrile, and $\beta$, $\beta'$-imina-dipropionitrile, moreover salts and esters of nitrous acid, organic nitroso compounds, heterocyclic compounds such as methylene blue, phenothiazine 8-hydroxyquinoline, and phenylnitrosohydroxylamine.

This list is by no means complete and does not indicate that stabilizers for acrylonitrile, which were not mentioned here, are not useful. The inhibitors are added to the acrylonitrile in amounts of 0.01 to 3.0% by weight, calculated on the acrylonitrile and they may be added singly or in mixtures of several of the above-named compounds.

A stabilization of the acrylonitrile thus effected brings about a complete suppression of the otherwise occurring polymerization enhanced by irradiation with visible or u.v. rays. This fact is of considerable significance from an economical point of view, since even a slight turbidity caused by small amounts of flocculating polymers markedly lowers the output of dimerization product calculated on energy applied.

It has furthermore been found that the conversion of acrylonitrile, which may or may not be mixed with an inhibitor as stated above, to cyclobutane-1,2-dinitrile may be substantially enhanced by irradiation with wave lengths between 800 and 160 m$\mu$, if at the same time one or more substances are added to the acrylonitrile, which are known as photo-sensitizing agents. The photo-sensitizing agents act as a transfer agent of the light energy. The sensitizing agents used in accordance with the invention should be substances which are chemically as indifferent as possible to acrylonitrile under the prevailing conditions.

Sensitizing agents for the photo-dimerization of acrylonitrile which are generally useful are ketones, more particularly of the formula

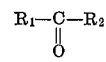

wherein $R_1$ and $R_2$ may either be the same or different alkyl groups of any desired chain length and degree of ramification and substitution; furthermore, aralkyl residues of any desired length and substitution, aryl residues of any desired substitution, residues of heteroaliphatic and heteroaromatic ring systems of any desired substitution, provided that the substituents are not nitro groups and are indifferent with respect to acrylonitrile. Moreover, $R_1$ and $R_2$ may themselves contain one or more keto groups.

Another group of sensitizing agents, which is generally useful, are benzaldehydes of the general formula

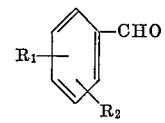

wherein $R_1$ and $R_2$ stand for hydrogen, alkyl radicals, aryl radicals, halogen, cyano- and ester groups, and may be either the same substituents or different substituents. Still another group of sensitizing agents for the photo-dimerization of acrylonitrile according to the invention are homologs and benzologs of $\gamma$-pyrone, whereby again substitution products of these may be used containing alkyl radicals, aryl radicals, halogen, cyano- and ester groups.

These sensitizing agents may be used in the reaction according to the invention singly or in mixtures. Moreover, they may be used in any desired weight ratio with the acrylonitrile but preferably in such a ratio that acrylonitrile will not be unduly diluted, since that would unfavorably reduce the yield.

The above-named compounds may be recovered unchanged or for the most part unchanged after the irradiation, and may be used again any number of times.

The best yields, calculated on the sensitizing agents and radiation input are achieved, in accordance with the invention, by using as such agents acetophenone, its substitution products or its homologs, e.g. p-methylacetophenone and propiophenone, and, on the other hand, benzophenone, its substitution products or homologs, e.g. 4,4'-dimethylbenzophenone and Michler's Ketone; furthermore, benzaldehyde and its substitution products, e.g. p-toluenealdehyde and p-bromobenzaldehyde; furthermore 2,6-dimethyl-γ-pyrone, 2-ethylchromone-1,4 and xanthone. With these above-mentioned photosensitizers, yields are obtainable which surpass the ones obtained by unsensitized irradiation by about 10 to 20 times.

It has further been found that the above-described photo-dimerization of acrylonitrile, with or without inhibitors and/or sensitizers, may also be carried out successfully in the presence of a solvent or mixture of solvents. As solvents it will of course be expedient to use only those which will not react with acrylonitrile or will undergo a reaction under the influence of light. A few examples of such solvents, which are not by any means exhaustive, are the following: ethers, e.g. diethyl ether, tetrahydrofurane, and preferably dioxane, aliphatic, cycloaliphatic and aromatic hydrocarbons, e.g. low boiling gasoline, ligroin, benzine, cyclopentane and cyclohexane, benzene, its homologs, water, alcohols, such as methanol, ethanol, furthermore halogenated hydrocarbons, e.g. methylene chloride, chloroform, carbon tetrachloride, dichloroethane, chlorobenzene and so on, furthermore organic acids, e.g. acetic acid, and so on.

These solvents may be used singly or in mixture with each other. The amounts will depend on the purpose for which they are used, which may be dilution, or increased solubility of the inhibitors or sensitizers, which are insufficiently soluble in acrylonitrile. In any case, care should be taken that too great a dilution of the acrylonitrile be avoided in order to maintain a satisfactory yield in cyclobutane-1,2-dinitrile.

It has further been found that the photo-dimerization of acrylonitrile to cyclobutane-1,2-dinitrile can be accomplished with or without the above-named additions within a broad temperature range. The actual temperature in each case will depend on the type of addition used and it may it may lie between 180° C. and −100° C. Conveniently, temperatures between 0 and 70° C. are used, which are preferably maintained by cooling. Depending on the temperatures and the additions in each case, it is sometimes advisable to work not only at normal pressure, but at pressures above normal in the range from normal to 9000 mm. Hg, preferably from normal to 2500 mm. Hg.

In some cases working in the gas phase is indicated, the temperature then ranging from 78 to 180° C.

The cyclobutane-1,2-dinitrile obtained as described above can be separated by fractional distillation from unreacted acrylonitrile and from additions such as inhibitors, sensitizers, and solvents. It is a viscous, semi-solid mixture of cis-and trans cyclobutane-1,2-dinitrile which in turn may be separated into its components by distillation.

According to another method the crude product may, after removal of unreacted acrylonitrile and additives, be saponified in known manner to yield the mixture of cis- and trans-cyclobutane-1,2-dicarboxylic acids, which may be isolated in a manner known per se.

When the product of the reaction is worked up by distillation, there will be either no residue or only a small amount of resinous residue, if work was previously carried out with a stabilizer. As a consequence, a total yield of 90–95%, calculated or reacted acrylonitrile can be achieved in spite of the comparatively small conversion occurring under the reaction conditions.

Cyclobutane-1,2-dinitrile can be further converted into hexamethylene-diamine and thus permits the use of acrylonitrile as intermediate for the production of polyamides.

The invention will now be more fully explained in a number of examples, but it should be understood that these are given by way of illustration and not of limitation and that many changes in the details can be made without departing from the spirit of the invention.

EXAMPLE 1

200 g. acrylonitrile were irradiated at 40° C. for 84 hours in the presence of 0.4 g. β,β'-imino-dipropionitrile as inhibitor, in a vessel externally cooled by water, by means of an immersion quartz lamp with mercury burner having a 70 watt output. No polymerization was observed. After distilling off unconverted acrylonitrile, 1.7 g. of a cis-trans mixture of cyclobutane-1,2-dinitrile were obtained in vacuo.

EXAMPLE 2

200 g. acrylonitrile were irradiated as described in Example 1 with 0.4 g. β,β'-imino-di-propionitrile and 6.6 g. acetophenone as sensitizer. No polymerization took place. After distillation of the unconverted acrylonitrile, acetophenone was first obtained in pure form in vacuo as distillate. Thereafter, 29.5 g. of the mixture of the cyclobutane-1,2-dinitrile isomers distilled over. The distillation residue was less than 0.5 g.

EXAMPLE 3

200 g. acrylonitrile were irradiated as in Example 1 with 0.5 g. cuprous chloride as inhibitor and 11.4 g. of 4,4'-dimethylbenzophenone as sensitizer. The immersion lamp was jacketed in this case with a current of cooling water so that the arcrylonitrile was not heated to more than 10° C. After distilling off the unconverted acrylonitrile the residue was saponified together with the sensitizer by boiling for 4 hours with half-concentrated hydrochloric acid. After cooling and diluting with water, the solid dimethyl benzophenone was filtered and the aqueous phase extracted with ether. Obtained were 37.5 g. of the cis-trans mixture of cyclobutane-1,2-di-carboxylic acid. No polymerization occurred.

EXAMPLE 4

A mixture of 150 g. acrylonitrile, 100 g. dioxane, 0.4 g. β,β'-imino-di-propionitrile and 10 g. acetophenone were irradiated as described in Example 1. After working up the reaction product, 12 g. of the isomeric mixture of cyclobutane-1,2-dinitrile were isolated. Polymerization was not observed.

EXAMPLE 5

A mixture of 150 g. acrylonitrile, 150 g. acetone, and 0.5 g. methylene blue was irradiated as described in Example 1. Polymerization was not observed. After distilling off the acrylonitrile and the aceton,e work-up occurred as in Example 3. Obtained were 10 g. of the isomeric mixture of the cyclobutane 1,2-dicarboxylic acids.

EXAMPLE 6

A mixture of 200 g. acrylonitrile, 0.4 g. β,β'-imino-dipropionitrile as polymerization inhibitor, and 5.8 g. benzaldehyde as photosensitizer was irradiated as described in Example 1. No polymerization was observed. After the distillation of the unconverted acrylonitrile, 4 g. benzaldehyde, 1 g. racemic 1,2-diphenylethylene glycol and 17 g. of a mixture of cis- and trans-cyclobutane-1,2-dinitrile distilled sequentially in vacuo.

EXAMPLE 7

A mixture according to Example 6, the sensitizer however being p-toluenealdehyde (6.7 g.), treated in the same way yielded 17.4 g. of a mixture of cis- and trans-cyclobutane-1,2-dinitrile. No polymerization was observed.

EXAMPLE 8

A mixture according to Example 6, the sensitizer however, being 2,6-dimethyl-γ-pyrone (6.8 g.), treated in the same way yielded 10.3 g. of a mixture of cis- and trans-cyclobutane-1,2 - dinitrile. No polymerization was observed.

EXAMPLE 9

A mixture according to Example 6, the sensitizer however being 2-ethylchromo-1,4 (9.7 g.), treated in the same way, yielded 19 g. of a mixture of cis- and trans-cyclobutane-1,2-dinitrile. No polymerization was observed.

EXAMPLE 10

From a mixture according to Example 6, the sensitizer and the polymerization inhibitor however being xanthone (10.8 g.) and cuprous chloride (0.5 g.) respectively the reaction temperature being 60° C., there was obtained, after distillation of the unconverted acrylonitrile, a semi-solid residue, which was extracted with cold aqueous methanol, xanthone remaining undissolved. When the extract was worked up in a manner known per se, the yield was 14 g. of a mixture of cis- and transcyclobutane-1,2-dinitrile. No polymerization was observed.

EXAMPLE 11

A mixture according to Example 2, the sensitizer however being F. 4 g. propiophenone, treated in the same way yielded 25 g. of a mixture of cis- and trans-cyclobutane-1,2-dinitrile. No polymerization was observed.

EXAMPLE 12

A mixture according to Example 3, the sensitizer however being 10.2 g. benzophenone and the irradiation being carried out without any polymerization inhibitor, the remaining part of Example 3 performed in the same way, yielded 40 g. of a mixture of cis- and trans-cyclobutane-1,2-dicarboxylic acid. No polymerization was observed.

The foregoing disclosure relates only to preferred embodiments of the invention which is intended to include all changes and modifications of the examples described within the scope of the invention as set forth in the appended claims.

What we claim is:

1. A process for making cyclobutane-1,2-dinitrile from acrylonitrile which comprises subjecting acrylonitrile to irradiation with rays of the wave length ranging from 800 to 160 mμ, distilling off the unreacted acrylonitrile and isolating the cyclobutane-1,2-dinitrile from the residue from the distillation.

2. The process according to claim 1, wherein at least one polymerization inhibitor is added to the acrylonitrile undergoing irradiation, in the amount of 0.001 to 10% by weight of the irradiated acrylonitrile.

3. The process according to claim 2, wherein the polymerization inhibitor is a member of the group consisting of polyvalent phenols, ammonia, β-amino-propionitrile, β,β'-imino-di-propionitrile, phenothiazine, methylene blue and inorganic and organic salts of mono- and divalent copper in amounts ranging from 0.01 to 3.0% by weight of acrylonitrile subjected to irradiation.

4. The process according to claim 1, wherein at least one photosensitizing agent is added to the mixture, selected from the group consisting of ketones, aromatic aldehydes and γ-pyrones.

5. The process according to claim 2, wherein at least one photosensitizing agent is added to the mixture, selected from the group consisting of ketones, aromatic aldehydes and γ-pyrones.

6. The process according to claim 1, wherein the irradiation is carried out in a solvent which is indifferent to acrylonitrile as well as to the rays of the wave lengths used for irradiation.

7. The process according to claim 4, wherein the irradiation is carried out in at least one solvent which is indifferent to acrylonitrile, to the rays of the wave lengths used for irradiation, as well as to the other additives contained in the mixture.

8. The process according to claim 4, wherein the ketone added is a member of the group consisting of acetophenone and benzophenone including homologs and substitution products of said ketones.

9. The process according to claim 4, wherein the aromatic aldeyhde added is a member selected from the group consisting of unsubstituted benzaldehyde and benzaldehyde substituted by lower alkyl and halogen.

10. The process according to claim 4, wherein the γ-pyrones added are selected from the group consisting of 2,6-dimethyl-γ-pyrone, 2-ethylchromone-1,4 and xanthone.

11. The process according to claim 1, wherein the irradiation is carried out at temperatures ranging from −100° pheric to 9000 mm. Hg.

12. The process according to claim 1, wherein the irradiation is carried out at temperature ranging from −100° C. to +180° C.

13. The process according to claim 1, wherein the irradiation is carried out at temperatures ranging from 0° C. to 70° C.

References Cited

UNITED STATES PATENTS 3,275,675  9/1966  Idol et al. _____ 260—464
3,203,973  8/1965  Griffin _____ 204—158 X

OTHER REFERENCES

Srinivasan, J.A.C.S., vol. 84 (1962), pp. 4141–45.

HOWARD S. WILLIAMS, Primary Examiner

U.S. Cl. X.R.

260—537

PO-1050
(5/69)

UNITED STATES PATENT OFFICE
CERTIFICATE OF CORRECTION

Patent No. 3,491,006          Dated January 20, 1970

Inventor(s) Jurgen RUNGE and Reinhard KACHE

It is certified that error appears in the above-identified patent and that said Letters Patent are hereby corrected as shown below:

In claim 11, column 6 line 40
"temperatures ranging from - 100° "
read -- pressures ranging from atmos- --

SIGNED AND
SEALED
JUN 23 1970

(SEAL)
Attest:

Edward M. Fletcher, Jr.
Attesting Officer

WILLIAM E. SCHUYLER, JR.
Commissioner of Patents